(12) United States Patent
Celiesius

(10) Patent No.: US 11,503,056 B1
(45) Date of Patent: Nov. 15, 2022

(54) PROVIDING A NOTIFICATION SYSTEM IN A VIRTUAL PRIVATE NETWORK

(71) Applicant: Oversec, UAB, Vilnius (LT)

(72) Inventor: Kazimieras Celiesius, Vilnius (LT)

(73) Assignee: Oversec, UAB, Vilnius (LT)

( * ) Notice: Subject to any disclaimer, the term of this patent is extended or adjusted under 35 U.S.C. 154(b) by 0 days.

(21) Appl. No.: 17/411,018

(22) Filed: Aug. 24, 2021

Related U.S. Application Data

(63) Continuation-in-part of application No. 17/397,655, filed on Aug. 9, 2021.

(51) Int. Cl.
| | |
|---|---|
| *H04L 9/40* | (2022.01) |
| *H04L 12/46* | (2006.01) |
| *H04L 61/4511* | (2022.01) |
| *G08B 7/06* | (2006.01) |

(52) U.S. Cl.
CPC ...... *H04L 63/1425* (2013.01); *H04L 12/4641* (2013.01); *H04L 61/4511* (2022.05); *H04L 63/0236* (2013.01); *H04L 63/0272* (2013.01); *H04L 63/14* (2013.01); *G08B 7/06* (2013.01)

(58) Field of Classification Search
CPC ............. H04L 63/1425; H04L 63/0272; H04L 63/0236; H04L 63/14; H04L 63/1441; H04L 29/06877; H04L 63/0281; H04L 63/168; H04L 63/1483; H04L 69/40; H04L 61/1511; G06F 21/53
USPC ......................................................... 726/23
See application file for complete search history.

(56) References Cited

U.S. PATENT DOCUMENTS

| | | | | |
|---|---|---|---|---|
| 8,046,374 | B1* | 10/2011 | Bromwich | G06F 21/552 |
| | | | | 707/759 |
| 8,909,766 | B1* | 12/2014 | Hegg | H04L 41/026 |
| | | | | 709/224 |
| 10,715,493 | B1* | 7/2020 | Moore | H04L 63/029 |
| 10,742,601 | B2* | 8/2020 | Xie | H04L 63/0227 |
| 11,003,468 | B2* | 5/2021 | Moore | G06F 9/445 |
| 11,057,324 | B1* | 7/2021 | Ahmed | H04L 51/10 |
| 11,240,257 | B2* | 2/2022 | Buck | H04L 63/168 |
| 2011/0238855 | A1* | 9/2011 | Korsunsky | G06F 21/56 |
| | | | | 709/231 |

(Continued)

FOREIGN PATENT DOCUMENTS

| | | | | |
|---|---|---|---|---|
| CN | 103891331 A | * | 6/2014 | ............. H04W 4/02 |
| CN | 105391642 A | * | 3/2016 | |

(Continued)

OTHER PUBLICATIONS

Google Ads Help, "URL", 2021 (Year: 2021).*

(Continued)

*Primary Examiner* — Nam T Tran
(74) *Attorney, Agent, or Firm* — The Pattani Law Group

(57) ABSTRACT

A method for providing a notification system in a virtual private network (VPN), the method comprising transmitting, to a user device, a notification indicating that data of interest requested by the user device potentially includes harmful content, the data of interest to be obtained from a host device; receiving, from the user device, a response indicating that the data of interest is to be received by the user device; receiving, based at least in part on the response, the data of interest from the host device; and transmitting the data of interest to the user device. Various other aspects are contemplated.

17 Claims, 8 Drawing Sheets

(56) References Cited

U.S. PATENT DOCUMENTS

| | | | | |
|---|---|---|---|---|
| 2012/0240185 A1* | 9/2012 | Kapoor | .................. | H04L 63/20 726/1 |
| 2013/0312081 A1* | 11/2013 | Shim | .................. | H04L 63/0236 726/13 |
| 2015/0082431 A1* | 3/2015 | Davis | .................. | H04L 63/1441 726/23 |
| 2016/0197933 A1* | 7/2016 | Lapidous | ............ | H04L 63/0272 726/26 |
| 2016/0226900 A1* | 8/2016 | Fajardo Verano | ...... | G06F 21/55 |
| 2018/0077195 A1* | 3/2018 | Gathala | ............... | H04L 63/1441 |
| 2018/0300475 A1* | 10/2018 | Zhang | ................. | H04L 63/0272 |
| 2019/0014087 A1* | 1/2019 | Robinson | ............ | G06F 16/9537 |
| 2019/0058714 A1* | 2/2019 | Joshi | ....................... | H04L 63/10 |
| 2019/0141015 A1* | 5/2019 | Nellen | ................ | H04L 61/1511 |
| 2020/0134141 A1* | 4/2020 | Ford | ........................ | G06F 21/44 |
| 2020/0287913 A1* | 9/2020 | Buck | ........................ | H04L 63/14 |
| 2020/0356661 A1* | 11/2020 | Stoletny | ............... | H04L 63/1416 |
| 2021/0133274 A1* | 5/2021 | Chu | ..................... | G06F 16/9577 |
| 2021/0176233 A1* | 6/2021 | Starov | ................... | H04L 63/145 |
| 2021/0201333 A1* | 7/2021 | Rachamadugu | .... | H04L 43/0817 |
| 2021/0336933 A1* | 10/2021 | Shah | ....................... | H04L 9/006 |

FOREIGN PATENT DOCUMENTS

| | | | | |
|---|---|---|---|---|
| CN | 106936791 A | * | 7/2017 | |
| WO | WO-2007015254 A2 | * | 2/2007 | ......... H04L 63/1408 |
| WO | WO-2012017132 A1 | * | 2/2012 | ............ H04W 76/12 |
| WO | WO-2021177989 A1 | * | 9/2021 | ............. G06F 12/14 |

OTHER PUBLICATIONS

Merriam-Webster, "Domain", 2021 (Year: 2021).*
Qian et al., "A Cloud-Based System for Enhancing Security of Android Devices", 2012 (Year: 2012).*
Shabtai et al., "Google Android: A Comprehensive Security Assessment", 2010 (Year: 2010).*
Wikipedia, "URL", 2021 (Year: 2021).*
Wikipedia, "Domain name", 2021 (Year: 2021).*

* cited by examiner

PROVIDING A NOTIFICATION SYSTEM IN A VIRTUAL PRIVATE NETWORK

CROSS REFERENCE

This application is a continuation-in-part of U.S. Non-Provisional patent application Ser. No. 17/397,655, filed on Aug. 11, 2021, and titled "Providing A Notification System In A Virtual Private Network," the entire contents of which are incorporated herein by reference.

FIELD OF DISCLOSURE

Aspects of the present disclosure generally relate to a virtual private network (VPN), and more particularly to providing a notification system in a VPN.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded, unreadable format with help of an encryption algorithm. Decryption may be associated with changing the data from being in the encoded, unreadable format to being in the transparently readable format with help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the stronger is the encryption.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

SUMMARY

In one aspect, the present disclosure contemplates a method for providing a notification system in a virtual private network (VPN), the method comprising receiving, from a user device, an indication that data of interest is to be requested, the indication including domain information associated with a host device capable of providing the data of interest; and transmitting, based at least in part on the domain information, a notification indicating to the user device that the data of interest to be requested from the host device potentially includes harmful content.

In another aspect, the present disclosure contemplates a device associated with a virtual private network (VPN), the device comprising a memory; and a processor communicatively coupled to the memory, the memory and the processor being configured to receive, from a user device, an indication that data of interest is to be requested, the indication including domain information associated with a host device capable of providing the data of interest; and to transmit, based at least in part on the domain information, a notification indicating to the user device that the data of interest to be requested from the host device potentially includes harmful content.

In another aspect, the present disclosure contemplates a non-transitory computer readable medium storing instructions, which when executed by a processor cause the processor to receive, from a user device, an indication that data of interest is to be requested, the indication including domain information associated with a host device capable of providing the data of interest; and to transmit, based at least in part on the domain information, a notification indicating to the user device that the data of interest to be requested from the host device potentially includes harmful content.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
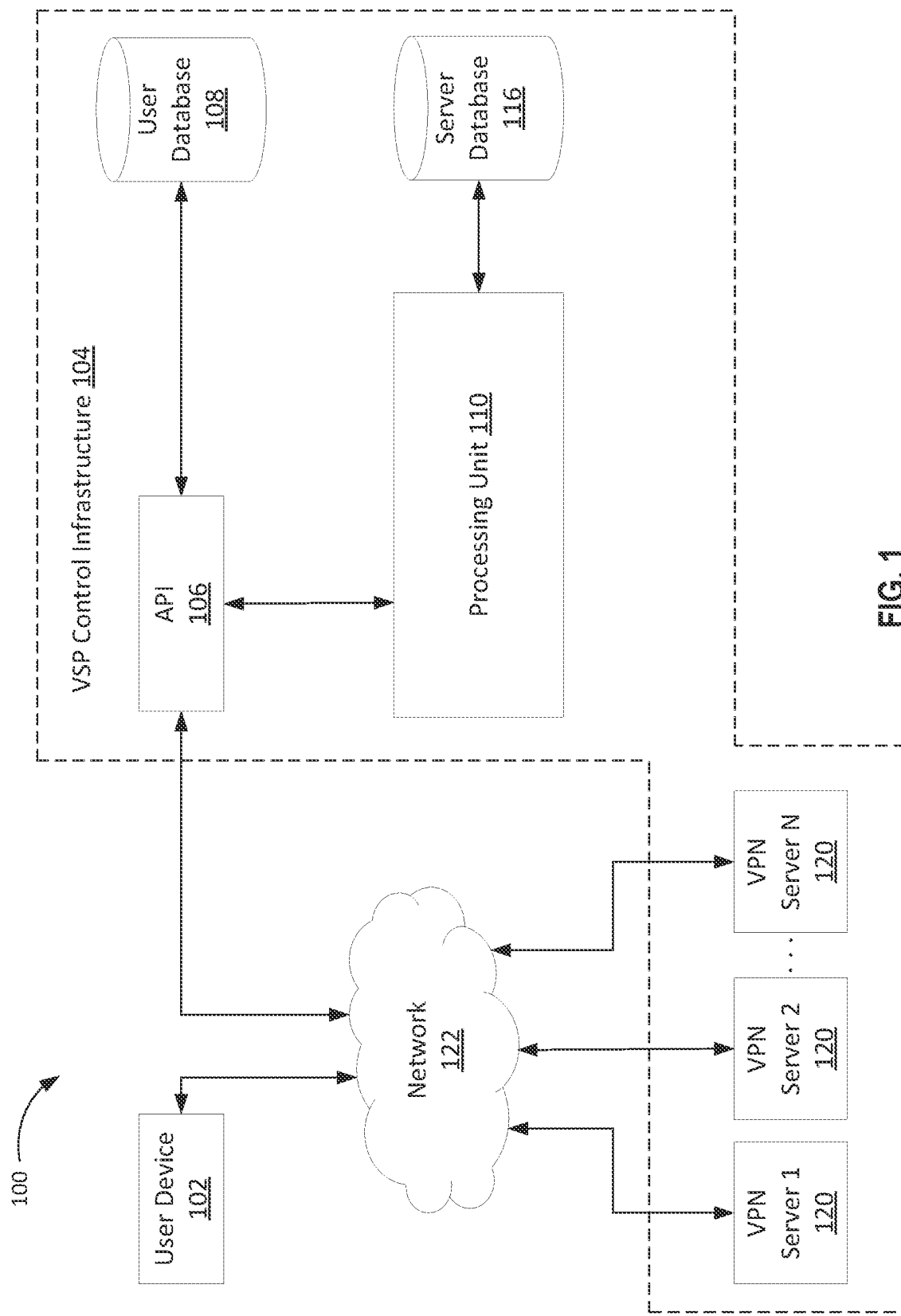

FIG. 1 is an illustration of an example system associated with providing a notification system in a VPN, according to various aspects of the present disclosure.

Figure 2:
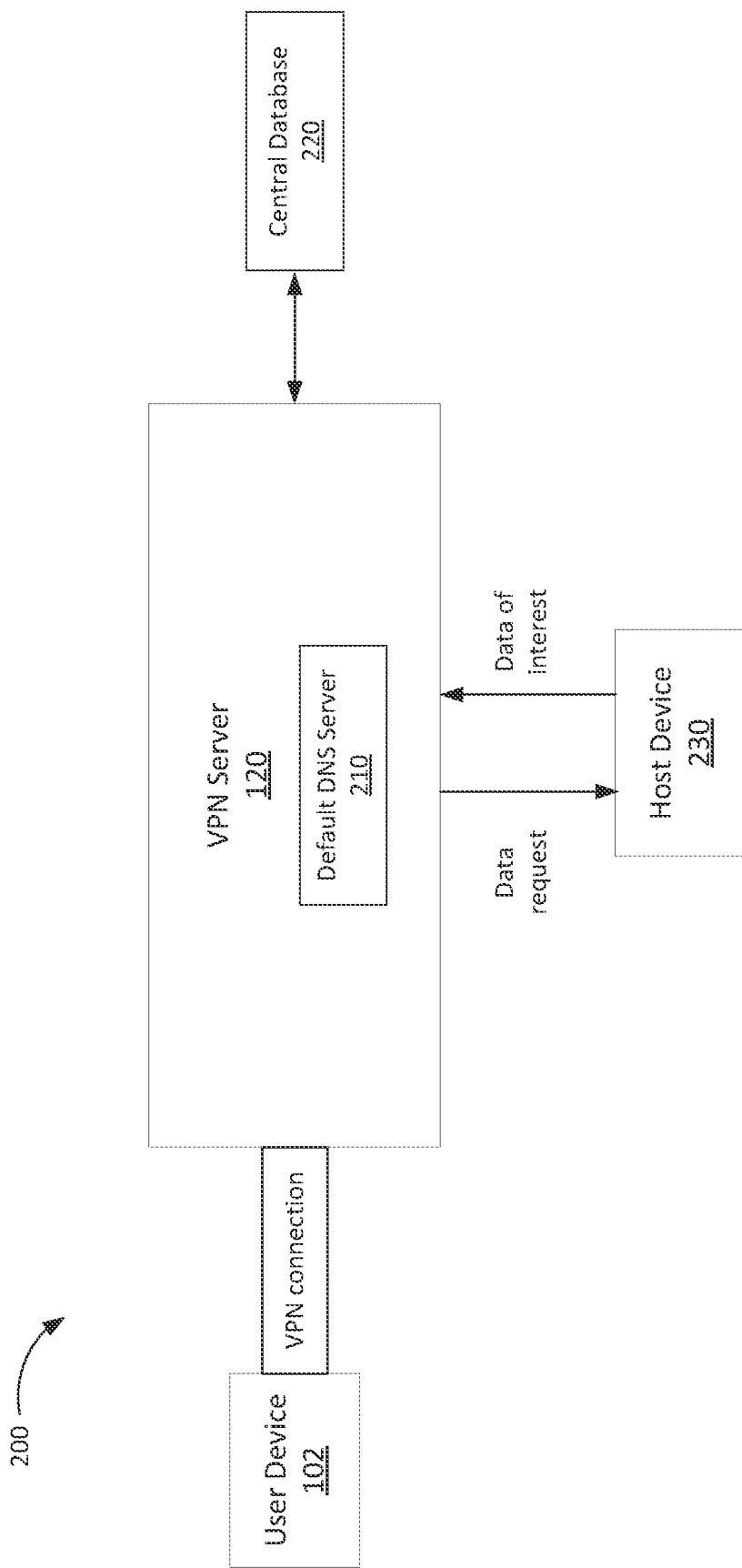

FIG. 2 is an illustration of an example system associated with providing a notification system in a VPN, according to various aspects of the present disclosure.

Figure 3:
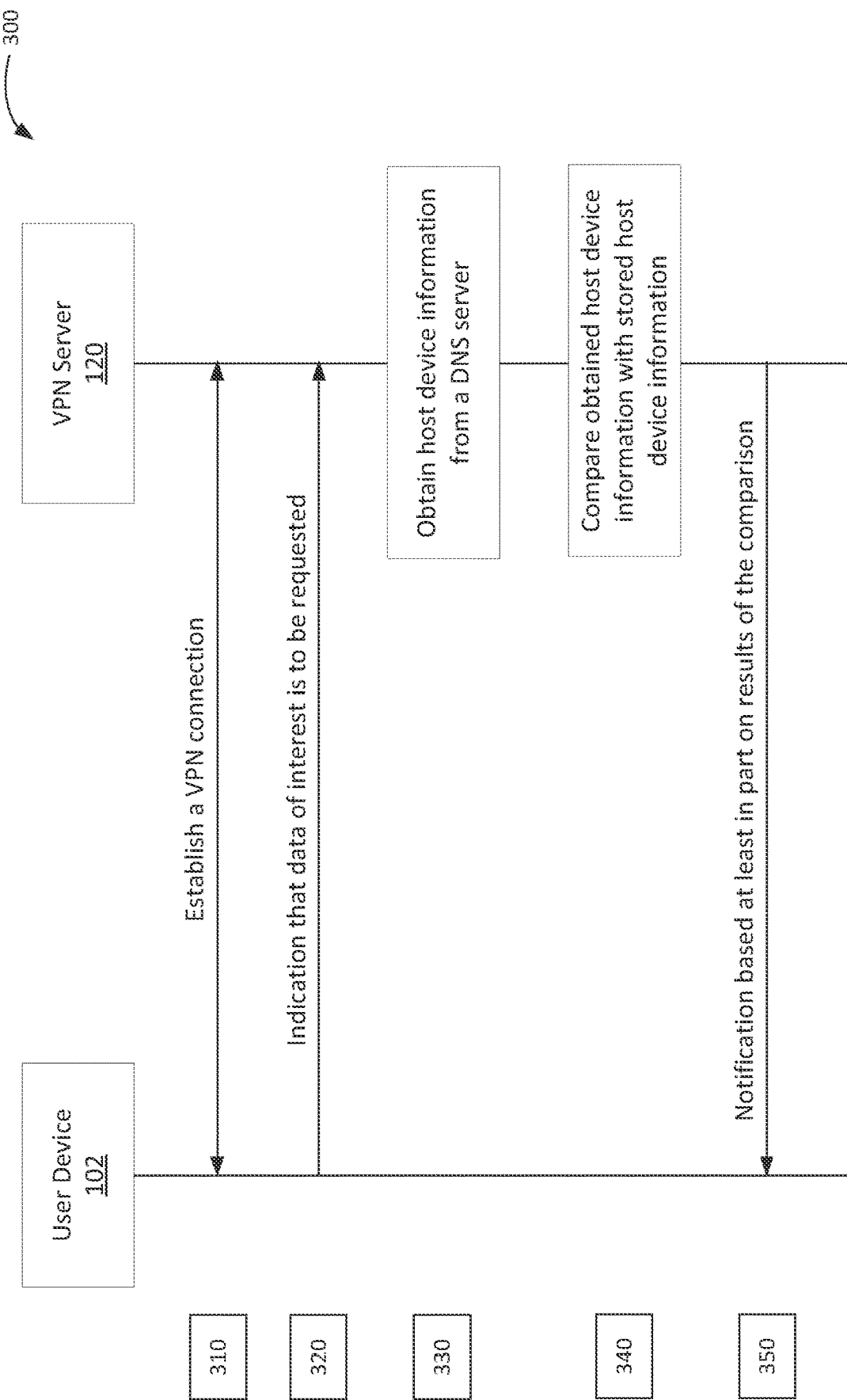

FIG. 3 is an illustration of an example flow associated with providing a notification system in a VPN, according to various aspects of the present disclosure.

Figure 4:
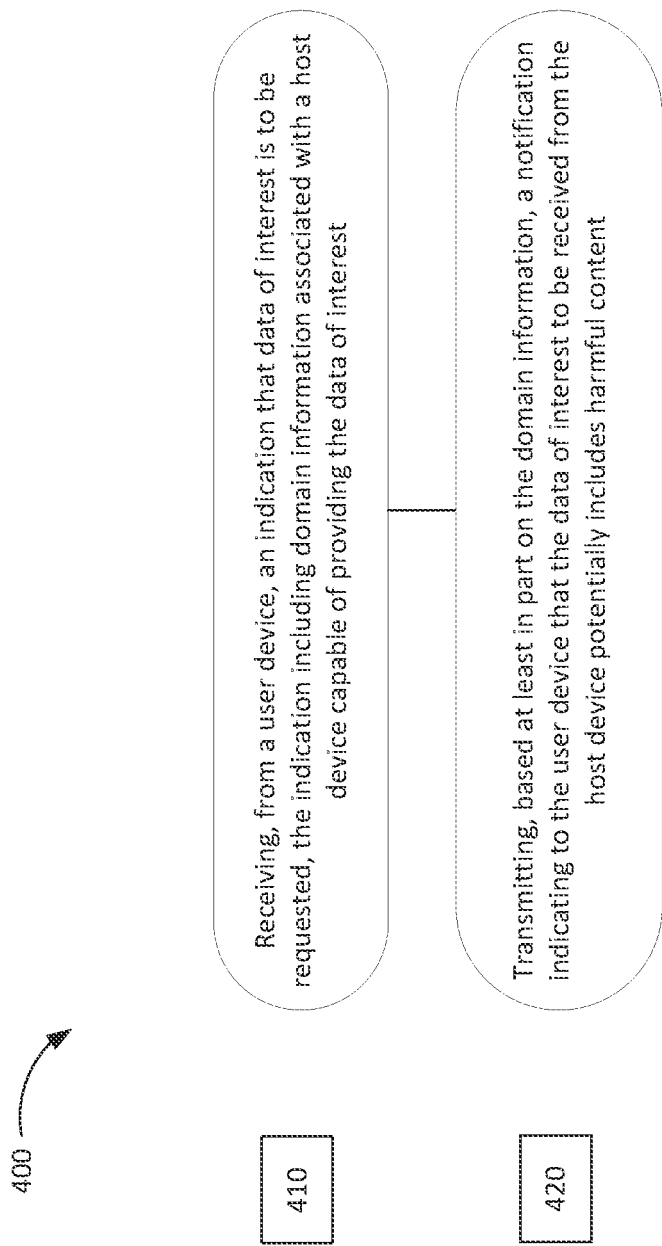

FIG. 4 is an illustration of an example process associated with providing a notification system in a VPN, according to various aspects of the present disclosure.

Figure 5:
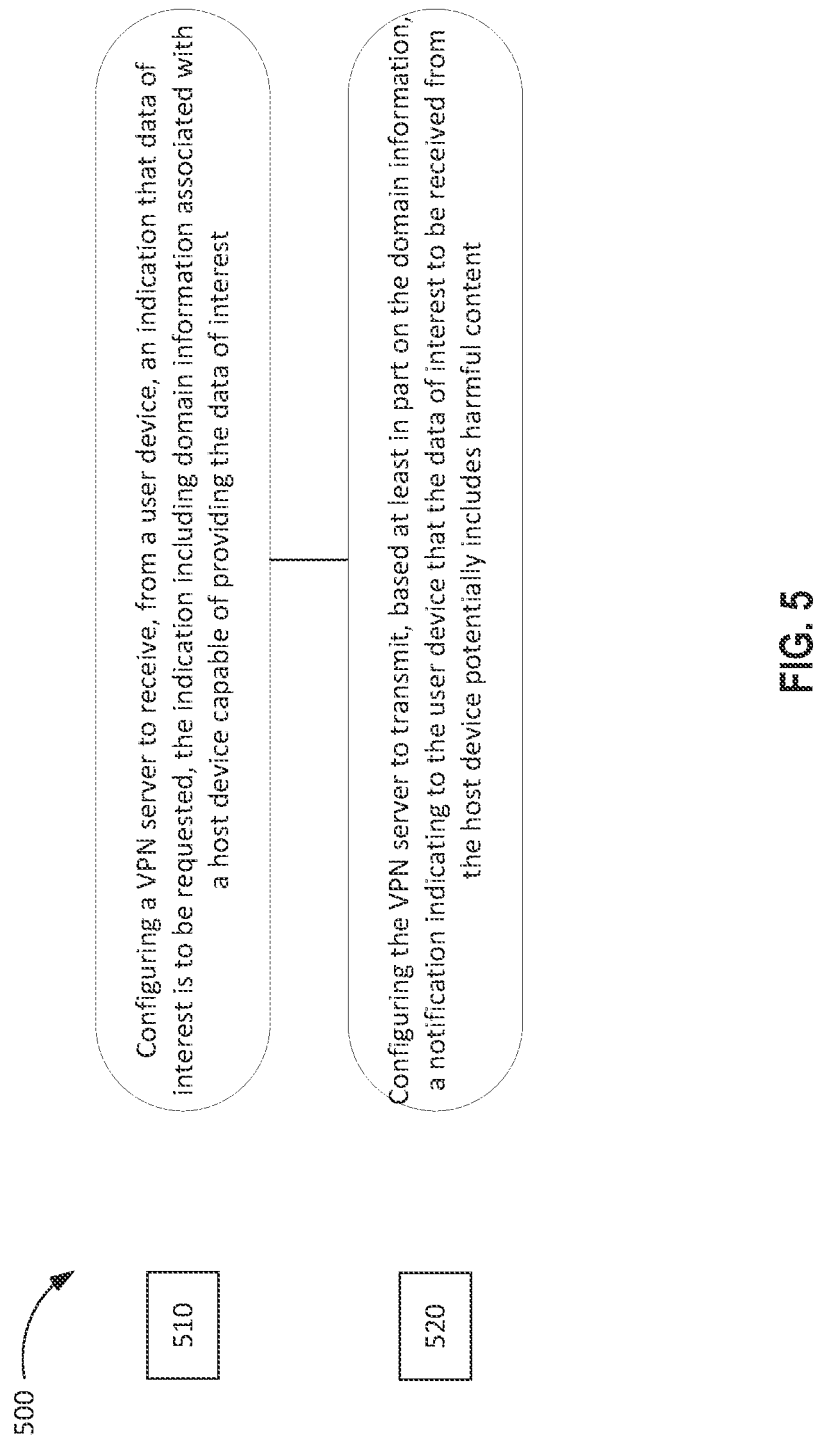

FIG. 5 is an illustration of an example process associated with providing a notification system in a VPN, according to various aspects of the present disclosure.

Figure 6:
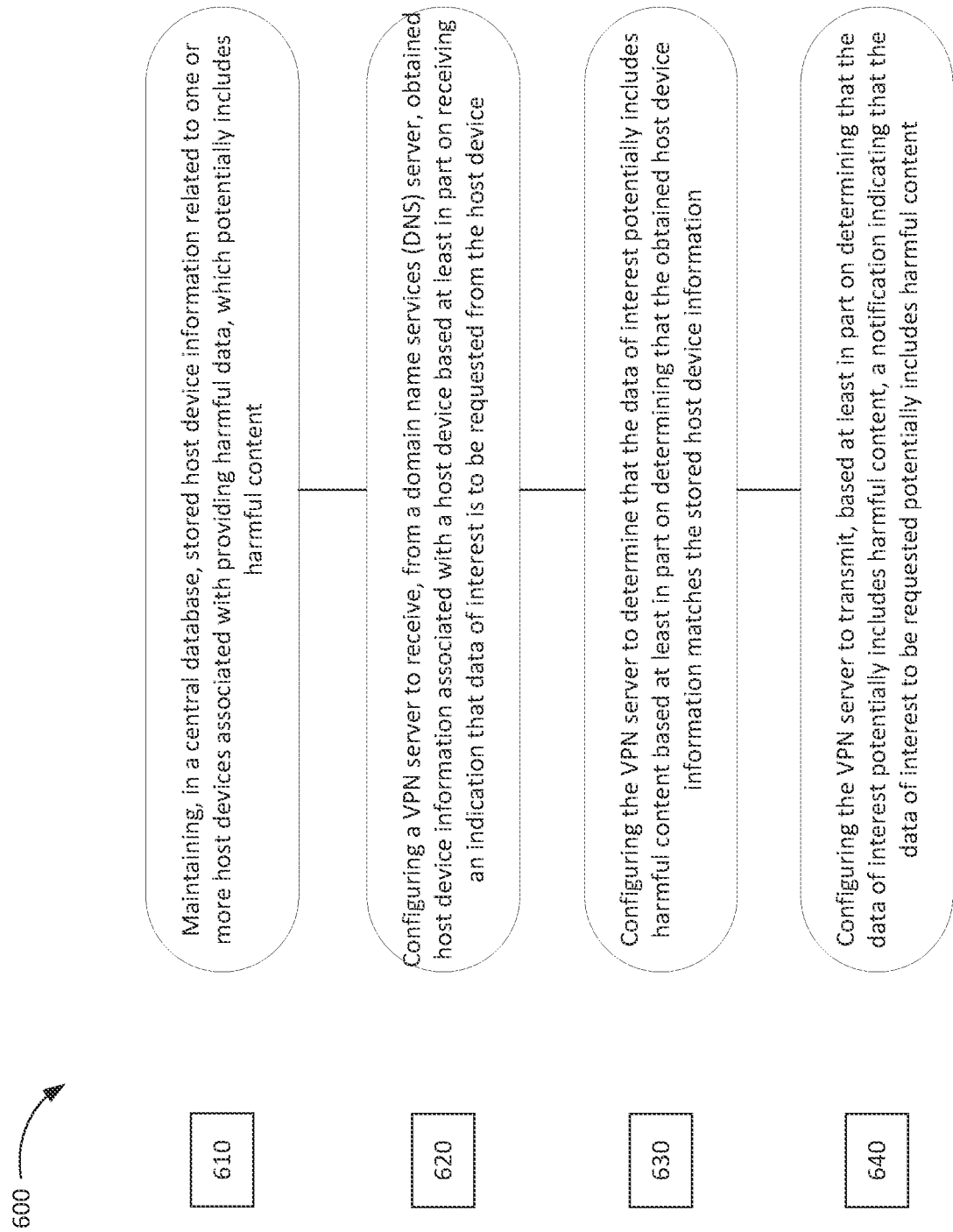

FIG. 6 is an illustration of an example process associated with providing a notification system in a VPN, according to various aspects of the present disclosure.

Figure 7:
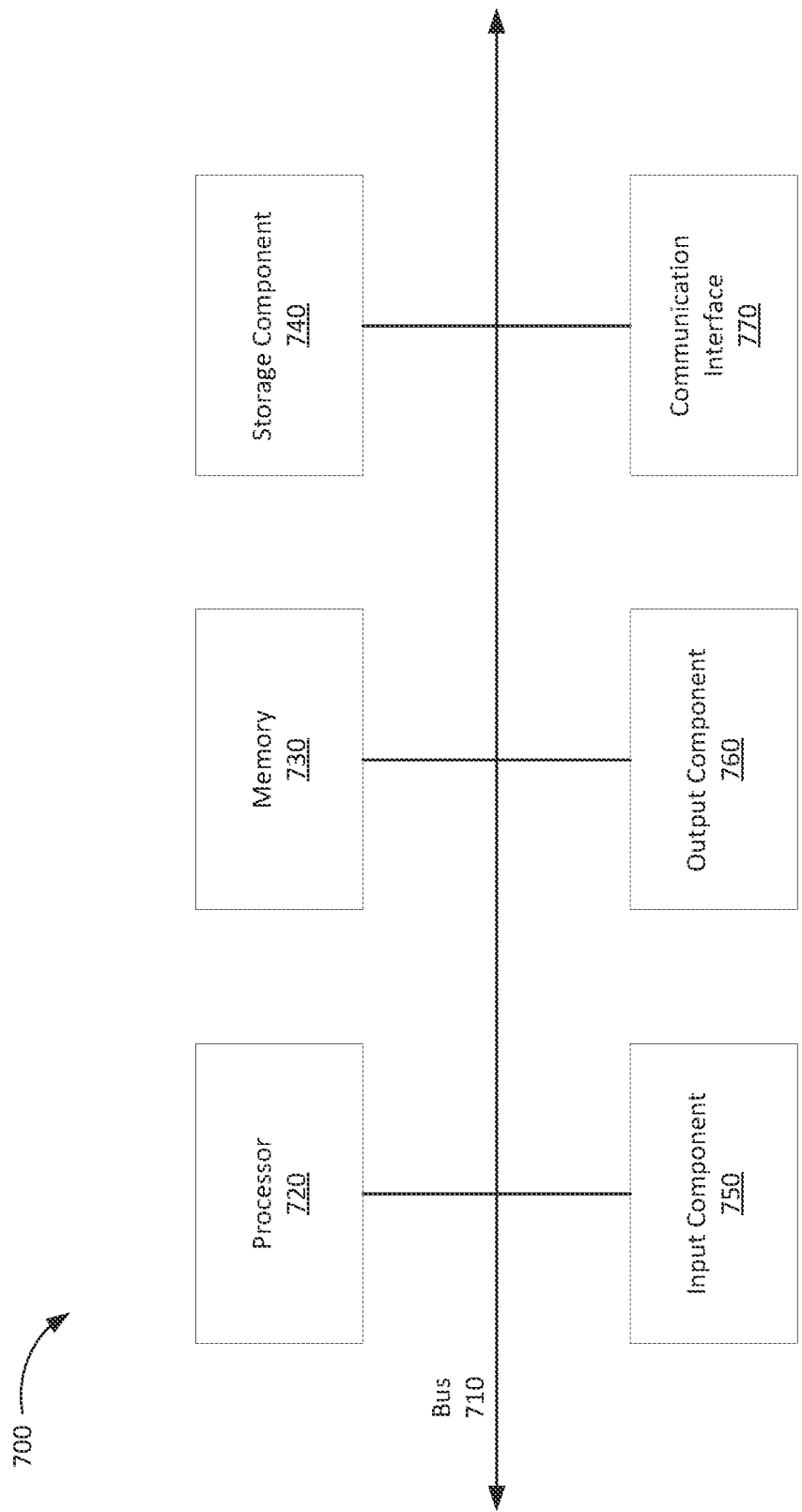

FIG. 7 is an illustration of example devices associated with providing a notification system in a VPN, according to various aspects of the present disclosure.

Figure 8:
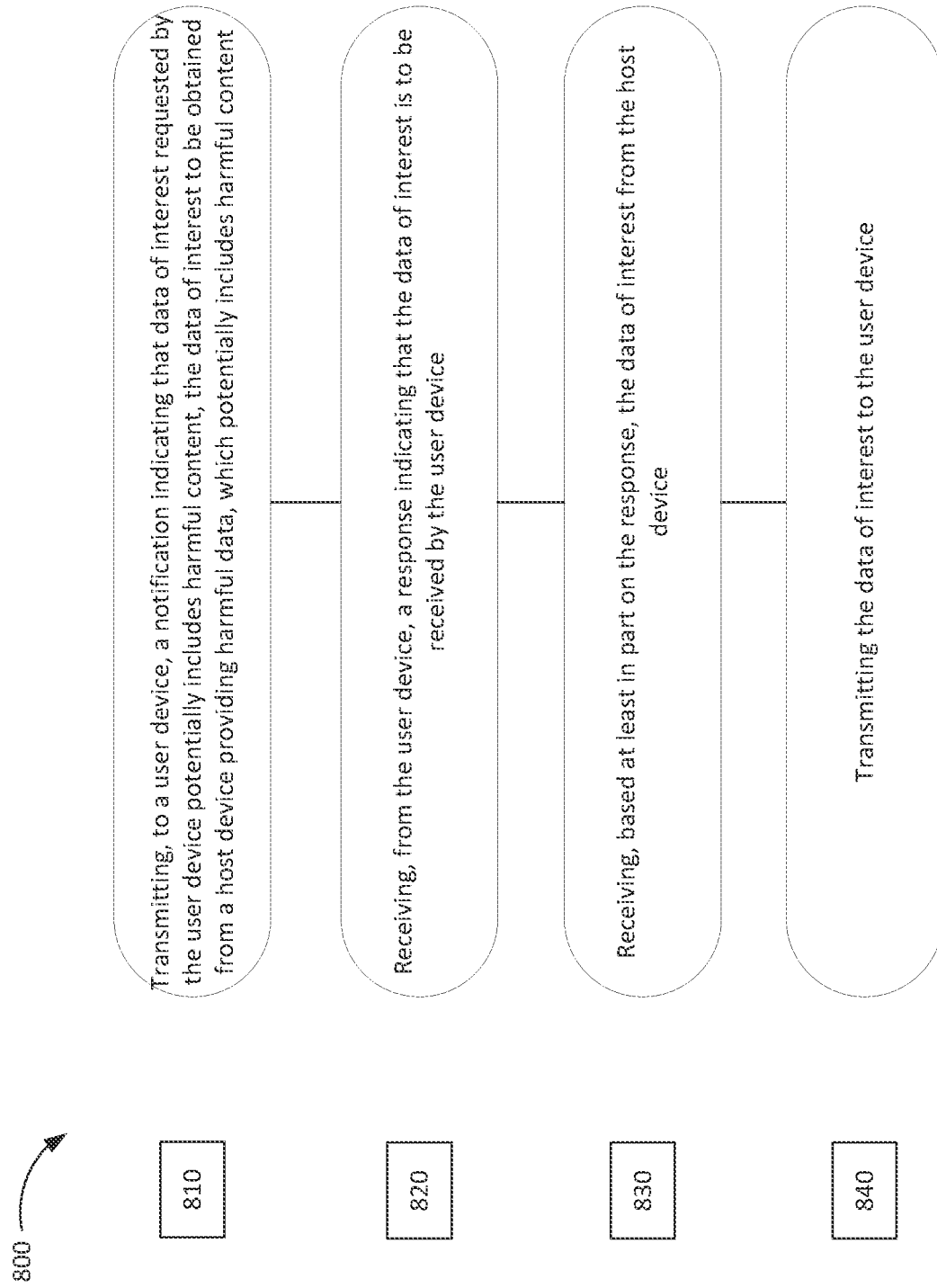

FIG. 8 is an illustration of an example process associated with providing a notification system in a VPN, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with rotating exit IP addresses in a VPN, according to various aspects of the present disclosure. Example 100 shows an architectural depiction of components included in system 100. In some aspects, the components may include a user device 102 capable of communicating with one or more VPN servers 120 and with a VPN service provider (VSP) control infrastructure 104 over a network 122. The VSP control infrastructure 104 may be controlled by a VPN service provider and may include an application programming interface (API) 106, a user database 108, processing unit 110, a server database 116, and the one or more VPN servers 120. As shown in FIG. 1, the API 106 may be capable of communicating with the user database 108 and with the processing unit 110. Additionally, the processing unit 110 may be capable of communicating with the server database, which may be capable of communicating with a testing module (not shown). The testing module may be capable of communicating with the one or more VPN servers 120 over the network 122. The processing unit 110 may be capable of controlling operation of the one or more VPN servers 120.

The user device 102 may be a physical computing device capable of hosting a VPN application and of connecting to the network 122. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 122 may be any digital telecommunication network that permits several nodes to share and access resources. In some aspects, the network 122 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 122, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may provide VPN services to the user device 102. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120. The user device 102 may transmit an initiation request to establish a VPN connection (e.g., an encrypted tunnel) with the optimal VPN server. In some aspects, the optimal VPN server with which the user device establishes the encrypted tunnel may be referred to as a primary VPN server or an entry VPN server. In some aspects, a VPN server 120 may be a piece of physical or virtual computer hardware and/or software capable of securely communicating with (the VPN application on) the user device 102 for provision of VPN services.

The processing unit 110 may be a logical unit including a scoring engine 112. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120.

In some aspects, based at least in part on server penalty scores calculated via the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

One or more components (e.g., API 106, user database 108, processing unit 110, and/or server database 116) included in the VSP control infrastructure 104 may further be associated with a controller/processor, a memory, or a combination thereof. For instance, the one or more components of the set of components may include or may be included in a controller/processor, a memory, or a combination thereof. In some aspects, the one or more of the components included in the VSP control infrastructure 104 may be separate and distinct from each other. Alternatively, in some aspects, one or more of the components included in the VSP control infrastructure 104 may be combined with one or more of other components included in the VSP control infrastructure 104. In some aspects, the one or more of the components included in the VSP control infrastructure 104 may be local with respect to each other. Alternatively, in some aspects, one or more of the components included in the VSP control infrastructure 104 may be located remotely with respect to one or more of other components included in the VSP control infrastructure 104. Additionally, or alternatively, one or more components of the components included in the VSP control infrastructure 104 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

A user device may establish a VPN connection with a VPN server to receive VPN services. During an established VPN connection, the user device may request the VPN server to obtain and provide data of interest to the user device. The user device may transmit a data request to the VPN server to request the data of interest. The data request may include domain information indicating, for example, a domain name associated with an owner and/or a source (e.g., owner/source) of the data of interest.

The VPN server may utilize an associated domain name services (DNS) server to resolve the domain information and provide a domain name and/or an internet protocol (IP) address associated with a host device capable of providing the data of interest. In an example, based at least in part on receiving the data request, the VPN server may contact the host device to obtain the data of interest. The VPN server may provide (e.g., transmit) the obtained data of interest to the user device. The associated DNS server may be a default DNS server utilized by the VPN server to service all received requests. In an example, the DNS server may be local to the VPN server and/or may be included within the VPN server, thereby enabling provision of speedy DNS services to the VPN server.

Receipt of the data of interest may compromise private information associated with the user device (e.g., a location of the user device, a list of websites visited by the user device, a nature of data requested by the user device, or the like) because the data of interest may include harmful content. For instance, the data of interest may include malicious software (e.g., malware) and/or cookies and/or tracking information. For instance, the private information associated with the user device may be traced, identified, and/or collected by the host device and/or by a third party. In an example, the host device may include a text file cookie in the data of interest, which text file cookie may enable the host device to track the user device and discover a list of websites visited by the user device. In another example, the host device may analyze information included in the data request (e.g., the exit IP address, a user-agent header, or the like) to determine a location of the user device. In yet another example, the data of interest may include third-party trackers/cookies that may enable third-party trackers to track the user device and to collect the private information. As a result, privacy of the user device may be compromised, and the user device may be unable to, among other things, privately send and receive data across public networks.

Additionally, the malware may be designed to disrupt, damage, and/or gain unauthorized access to the user device. Upon receiving the data of interest, the malware may embed itself within an operating system of the user device and may execute an unauthorized transmission of private information stored in a memory associated with the user device and/or an unauthorized deletion of data stored in the memory. The malware may also adversely affect the operating system of the user device such that the operating system may run slower and/or associated circuitry may emit excessive heat and/or noise, thereby causing damage to the user device. In such cases, the established VPN connection between the user device and the VPN server may terminate abruptly. As a result, the user device and the VPN server may re-establish the VPN connection. The abrupt termination and the necessary re-establishing of the new VPN connection may inefficiently consume user device resources (e.g., processing resources, memory resources, power consumption resources, battery life, or the like) and resources associated with the VPN (computational resources, network bandwidth, management resources, processing resources, memory resources, or the like) that can otherwise be used to perform suitable tasks associated with the VPN.

Various aspects of systems and techniques discussed in the present disclosure enable providing a notification system in a VPN. In some aspects, providing the notification system may include a VSP control infrastructure (e.g., VSP control infrastructure 104) compiling and storing, in a central database, a list of domain names and/or IP addresses associated with host devices that are believed to include harmful content in provided data of interest. Such central database may be accessible by one or more VPN servers associated with the VSP control infrastructure. The VSP control infrastructure may configure the one or more VPN servers to utilize domain information, received in a data request from a user device, to determine whether the domain information is associated with a host device believed to include harmful content in provided data of interest. In some aspects, the VSP control infrastructure may configure the one or more VPN servers to receive, based at least in part on the domain information, a domain name and/or an IP address from a DNS server, and to compare the received domain name and/or IP address with the list of domain names and/or IP addresses stored in the central database. Further, based at least in part on the results of the comparison, the VSP control infrastructure may configure the one or more VPN servers to transmit, prior to obtaining the data of interest from the host device, a notification to the user device indicating that the data of interest may potentially include harmful content. In this way, the user device may decide to refrain from receiving the data of interest that potentially includes harmful content. As a result, the VSP control infrastructure and/or the VPN server may mitigate instances of private information associated with the user device becoming compromised. Consequently, the VSP control infrastructure and/or the VPN server may enable the user device to, among other things, protect its privacy and/or privately send and receive data across public networks. Abrupt termination and re-establishing of the VPN connection may also be avoided, thereby conserving user device resources and resources associated with the VPN.

In some aspects, the VSP control infrastructure may configure the VPN server to receive, from a user device, a data request for requesting data of interest, the data request including domain information associated with a host device capable of providing the data of interest; and transmit, based at least in part on the domain information, a notification indicating to the user device that the data of interest potentially includes harmful content.

FIG. 2 is an illustration of an example system 200 associated with providing a notification system in a VPN, according to various aspects of the present disclosure. The example system 200 may include a user device 102, a VPN server 120 associated with a default DNS server 210, a central database 220, and a host device 230. The default DNS server 210 may be local to the VPN server 120 and/or may be included within the VPN server 120, thereby enabling speedy DNS services to the VPN server 120. The central database 220 may be located remotely with respect to the VPN server 120 and may enable the VPN server 120 to access stored host device information. The VPN server 120 may be configured by a VSP control infrastructure (not shown) to provide VPN services to the user device 102.

The user device 102 may undergo an authentication process with a VSP control infrastructure (e.g., VSP control infrastructure) to receive VPN services via a VPN network. Such VPN services may include requesting and/or receiving data of interest from a host device (e.g., host device 230). The data of interest may include any data requested and/or received by the user device 102. Examples of the data of interest may include multimedia content such as, for example, audio content, video content, audio-video content, images, animations, slideshows, interactive gaming media, low-latency applications such as gambling applications, textual data, textual information, or the like.

Upon authentication of the user device 102, the VSP control infrastructure may enable the user device 102 to establish a VPN connection with the VPN server 120, which may be an optimal VPN server for providing VPN services to the user device 102. In some aspects, the VPN server 120 may be the optimal server because, for example, because the VPN server 120 may be located geographically/physically closer (and therefore able to provide speedier service) to the user device 102 as compared to the other VPN servers, the VPN server 120 may have the highest available bandwidth to provide VPN services to the user device 102 as compared to the other VPN servers, and/or the VPN server 120 may be located geographically/physically closer to an international Internet exchange hub (and therefore able to provide speedier service) as compared to the other VPN servers.

To establish the VPN connection, the user device 102 may transmit, and the VPN server 120 may receive, an initiation request. Based at least in part on receiving the initiation request, the VPN server 120 may enable the user device 102 to establish a VPN connection with the VPN server 120. In some aspects, the VPN connection may be established using a VPN protocol such as, for example, proxy protocol v2, IP in IP (Protocol 4): IP in IPv4/IPv6; SIT/IPv6 (Protocol 41): IPv6 in IPv4/IPv6; GRE (Protocol 47): Generic Routing Encapsulation; OpenVPN (UDP port 1194); SSTP (TCP port 443): Secure Socket Tunneling Protocol; IPSec (Protocol 50 and 51): Internet Protocol Security; L2TP (Protocol 115): Layer 2 Tunneling Protocol; VXLAN (UDP port 4789): Virtual Extensible Local Area Network; WireGuard; Quic, and other available data communication protocols and their future iterations.

During the VPN connection, the VPN server 120 may receive an indication that the user device 102 may request data of interest (e.g., that data of interest is to be requested). In some aspects, the indication may include a domain name request for obtaining a domain name and/or an IP address associated with a host device from whom the data of interest is to be requested. For instance, the indication may include domain information associated with the host device 230, which may be capable of providing the data of interest. The domain information may indicate, for example, an identity of and/or a domain associated with an owner/source of the data of interest. In some aspects, the host device 230 may be controlled and/or operated by the owner/source of the data of interest.

Based at least in part on receiving the indication including the domain information, the VPN server 120 may communicate (e.g., transmit and/or receive) with the default DNS server 210 to receive a domain name and/or an IP address associated with the host device 230. The DNS server 210 may resolve the domain information and return the domain name and/or IP address associated with the host device 230. Based at least in part on receiving the domain name and/or IP address (e.g., obtained host device information) associated with the host device 230, the VPN server 120 may access the central database 220 to determine whether the domain name and/or IP address provided by the DNS server 210 is associated with providing data of interest potentially including harmful content (e.g., malware, cookies, tracking information, etc.). In some aspects, the VPN server 120 may access the central database 220 to determine whether the user device 102 is to request data of interest that potentially includes harmful content.

The central database 220 may be operated and maintained by the VSP control infrastructure. In some aspects, the VSP control infrastructure may compile and store in the central database 220 a list of domain names and/or IP addresses (e.g., stored host device information) associated with host devices believed to include and/or allow harmful content in the provided data of interest. The VSP control infrastructure may compile the list of such domain names and/or IP addresses based at least in part on publicly available lists of such domain names and/or IP addresses, purchasing lists of such domain names and/or IP addresses, crawling the open Internet to discover such domain names and/or IP addresses, data (e.g., survey data, complaints, feedback, or the like) provided by user devices receiving VPN services from the VSP control infrastructure, or the like. The list may include domain names and/or IP addresses related to entities and/or host devices associated with, for example, online trackers that utilize third-party cookies to compromise private information associated with user devices. The list may also include domain names and/or IP addresses associated with entities known to disseminate computer viruses, malware, or the like to damage and/or gain unauthorized access to user devices. Further, the list may include domain names and/or IP addresses with associated with entities and/or host devices associated with potential or known phishing websites (e.g., fake shopping websites, etc.) that attempt to steal private information (e.g., username, password, financial information, etc.) by masquerading as legitimate websites.

In some aspects, harmful content may include any content such as cookies and/or tracking information that may lead to private information associated with the user device 102 becoming compromised (e.g., traced, identified, collected, etc.). Further, the harmful content may include malware designed to disrupt, damage, and/or gain unauthorized access to the user device 102.

In some aspects, the VPN server 120 may compare the obtained host device information with the stored host device information to determine whether the host device 230 is a host device that is believed to include or allow harmful content in the provided data of interest. When the obtained host device information matches the stored host device information (e.g., the domain name and/or IP address received from the DNS server 210 is included in the list of domain names and/or IP addresses maintained in the central database 220), the VPN server 120 may determine that the host device 230, from whom the user device 102 may request the data of interest, is believed to include and/or allow the harmful content while providing the data of interest. In some aspects, the VPN server 120 may determine that the user device 102 is to request data of interest that potentially includes harmful content.

In this case, the VPN server 120 may transmit, in real-time, a notification to indicate to and/or alert the user device 102 that any data of interest to be requested and/or received from the host device 230 may potentially include the harmful content. In some aspects, the notification may include a push notification pushed (e.g., transmit) by the VPN server 120 to the user device 102 based at least in part on determining that the host device 230 is believed to include and/or allow the harmful content while providing the data of interest. In some aspects, the notification may include an audio notification and/or a visual notification. The audio notification may include playing a sound and/or an audio message on the user device 102 and/or on a device associated with the user device 102. The visual notification may include displaying an image and/or text (e.g., a pop-up message) on a screen associated with the user device 102. In some aspects, the VPN server 120 may transmit a pre-selected type of notification selected by the user device 102. For instance, the user device 102 may utilize a client application installed on the user device 102 to pre-select a type of notification to be received from the VPN server 120, and the VPN server 120 may transmit the notification in accordance with the type of notification pre-selected by the user device 102.

In some aspects, the notification may include digital option buttons to be utilized by the user device 102 to indicate whether the user device 102 would like to ignore the notification and proceed to transmit a data request for the VPN server 120 to obtain and provide the data of interest to the user device 102, or the user device 102 would like to refrain from requesting and/or receiving the data of interest from the host device 230. For instance, a first digital option button may be associated with an option indicating that the user device 102 would like to ignore the notification and proceed to transmit the data request, and a second digital option button maybe associated with an option indicating that the user device 102 would like to refrain from requesting and/or receiving the data of interest from the host device 230. In some aspects, the VPN server 120 may transmit the notification prior to obtaining the data of interest from the host device 230. In this way, the VPN server 120 may enable efficient use of resources in case the user device 102 indicates that the user device 102 would like to refrain from requesting and/or receiving the data of interest.

In some aspects, the VPN server 120 may transmit a report message to the VSP control infrastructure reporting the option button selected by the user device 102. For instance, the report message may indicate that the user device 102 opted to ignore the notification when the user device 102 selects the first digital option button. Alternatively, the report message may indicate that the user device 102 opted to refrain from receiving the data of interest when the user device 102 selects the second digital option button.

Based at least in part on receiving the report message, the VSP control infrastructure may update the list of domain names and/or IP addresses maintained in the central database 220. For instance, the VSP control infrastructure may decrease a counter and/or a level associated with a likelihood that the host device 230 includes and/or allows the harmful content while providing the data of interest when the user device 102 selects the first digital option button. Alternatively, the VSP control infrastructure may increase a counter and/or a level associated with the likelihood that the host device 230 includes and/or allows the harmful content while providing the data of interest when the user device 102 selects the second digital option button. In this way, the VSP control infrastructure may enable updating of the list of domain names and/or IP addresses stored in the central database 220.

Additionally, the VSP control infrastructure may enable the VPN server 120 to either transmit the notification or to refrain from transmitting the notification to another user device based at least in part on the selection made by the user device 102. For instance, the VSP control infrastructure may configure the VPN server 120 to refrain from transmitting the notification to another user device (that indicates that the data of interest may be received from the same domain name and/or IP address received from the DNS server 210) when the user device 102 selects the first digital option button, and may configure the VPN server 120 to transmit the notification to the other user device when the user device 102 selects the second digital option button.

Additionally, or alternatively, the VSP control infrastructure may update a profile associated with the user device 102 to indicate the selection made by the user device 102. Further, the VSP control infrastructure may configure one or more VPN servers 120 associated with the VSP control infrastructure in accordance with the selection made by the user device 102. For instance, when the user device 102 selects the first digital option button, the VSP control infrastructure may configure the one or more VPN servers to refrain from transmitting the notification when the user device 102 again indicates, in the future, that data of interest is to be requested and/or received from the same domain name and/or IP address. In this way, the VSP control infrastructure may configure the one or more VPN servers in accordance with a preference of the user device 102 and avoid transmitting a nuisance notification. Alternatively, when the user device 102 selects the second digital option button, the VSP control infrastructure may configure the one or more VPN servers to transmit the notification when the user device 102 again indicates, in the future, that data of interest is to be requested and/or received from the same domain name and/or IP address.

In some aspects, the notification may be based at least in part on a notification token assigned by the VSP control infrastructure and/or the VPN server 120 to the user device 102. For instance, the VSP control infrastructure and/or the VPN server 120 may assign a first notification token to the user device 102 based at least in part on the user device 102 operating using a first operating system (e.g., android operating system, Windows operating system, etc.), and may assign a second notification token to the user device 102 based at least in part on the user device 102 operating using a second operating system (e.g., iOS operating system, Mac operating system, etc.). In this case, the VPN server 120 may transmit, based at least in part on the notification token, a first type of notification compatible with the first operating system or a second type of notification compatible with the second operating system.

In some aspects, prior to transmitting the notification, the VPN server 120 may analyze a notification policy associated with the user device 102. The notification policy may be stored in the central database or in another memory associated with the VSP control infrastructure and accessible by the VPN server 120. The notification policy my indicate preferences of the user device with respect to receiving the notifications. In an example, the notification policy may indicate that the user device 102 has opted to receive notifications. Alternatively, the notification policy may indicate that the user device 102 has opted out of receiving notifications. Based at least in part on the notification policy, the VPN server 120 may transmit the notification when the user device 102 has opted to receive notifications and may refrain from transmitting the notification when the user device 102 has opted out of receiving notifications. Similarly, the notification policy may indicate a preference of the user device 102 to receive notifications associated with a given domain name and/or IP address. Based at least in part on the notification policy, the VPN server 120 may transmit the notification when the user device 102 has indicated a preference to receive notifications associated with the given domain name and/or IP address and may refrain from transmitting the notification when the user device 102 has indicated a preference to not receive notifications associated with the given domain name and/or IP address.

In some aspects, the VPN server 120 may transmit the obtained domain name and/or IP address of the host device 230 to the user device 102 with the notification to allow the user device 102 to properly evaluate the domain name and/or IP address and determine whether the user device 102 would like to receive data of interest from the host device 230. Alternatively, the VPN server 120 may transmit the obtained domain name and/or IP address of the host device 230 based at least in part on determining that the user device 102 has selected the first digital option button. Based at least in part on receiving the obtained a domain name and/or IP address, the user device 102 may transmit, and the VPN server 120 may receive, a data request for the data of interest. Based at least in part on receiving the data request, the VPN server 120 may obtain the data of interest from the host device 230 and provide the data of interest to the user device 102.

In this way, by adopting the above techniques of the notification system described herein, the VSP control infrastructure and/or the VPN server 120 may alert the user device that harmful content may potentially be included in data of interest that the user device may receive. Based at least in part on such an alert, the user device may decide to refrain from receiving the data of interest. As a result, the VSP control infrastructure and/or the VPN server may mitigate instances of private information associated with the user device becoming compromised. Consequently, the VSP control infrastructure and/or the VPN server may enable the user device to, among other things, protect its privacy and/or privately send and receive data across public networks. Abrupt termination and re-establishing of the VPN connection may also be avoided, thereby conserving user device resources and resources associated with the VPN.

As indicated above, FIG. 2 is provided as an example. Other examples may differ from what is described with regard to FIG. 2.

FIG. 3 is an illustration of an example flow 300 associated with providing a notification system in a VPN, according to various aspects of the present disclosure. The example flow 300 may include a user device 102 in communication with a VPN server 120. In some aspects, as discussed elsewhere herein, a VSP control infrastructure associated with the VPN server 120 may configure the VPN server 120 to provide VPN services to the user device 102.

As shown by reference numeral 310, upon authentication of the user device 102, the VPN server 120 may and the user device 102 may establish a VPN connection, as discussed elsewhere herein. During the VPN connection, as shown by reference numeral 320, the VPN server 120 may receive an indication that the user device 102 may request data of interest (e.g., that data of interest is to be requested), the indication including domain information associated with a host device (e.g., host device 230) capable of providing the data of interest, as discussed elsewhere herein. Based at least in part on receiving the indication including the domain information, as shown by reference numeral 330, the VPN server 120 may obtain host device information from a DNS server (e.g., DNS server 210), as discussed elsewhere herein. Based at least in part on receiving the obtained host device information, as shown by reference number 340, the VPN server 120 may compare the obtained host device information with stored host device information that is stored in a central database, as discussed elsewhere herein.

Based at least in part on a result of the comparison, as shown by reference numeral 350, the VPN server 120 may transmit, in real-time, a notification to indicate to and/or alert the user device 102 that any data of interest to be requested and/or received from the host device 230 may potentially include the harmful content, as discussed elsewhere herein. Based at least in part on receiving the notification (and/or the obtained a domain name and/or IP address), the user device 102 may transmit, and the VPN server 120 may receive, a data request for the data of interest. Based at least in part on receiving the data request, the VPN server 120 may obtain the data of interest from the host device 230 and provide the data of interest to the user device 102, as discussed elsewhere herein.

As indicated above, FIG. 3 is provided as an example. Other examples may differ from what is described with regard to FIG. 3.

FIG. 4 is an illustration of an example process 400 associated with providing a notification system in a VPN, according to various aspects of the present disclosure. In some aspects, the process 400 may be performed by a memory (e.g., memory 730) and/or a processor (e.g., processor 720) associated with a VPN server (e.g., VPN server 120). As shown by reference numeral 410, process 400 may include receiving, from a user device, an indication that data of interest is to be requested, the indication including domain information associated with a host device capable of providing the data of interest. For instance, the VPN server may utilize a communication interface (e.g., communication interface 770) and the associated memory and/or processor to receive, from a user device, an indication that data of interest is to be requested, the indication including domain information associated with a host device capable of providing the data of interest, as discussed elsewhere herein.

As shown by reference numeral 420, process 400 may include transmitting, based at least in part on the domain information, a notification indicating to the user device that the data of interest to be requested and/or received from the host device potentially includes harmful content. For instance, the VPN server may utilize the communication interface (e.g., communication interface 770) and the associated memory and/or processor to transmit, based at least in part on the domain information, a notification indicating to the user device that the data of interest to be requested and/or received from the host device potentially includes harmful content, as discussed elsewhere herein.

Process 400 may include additional aspects, such as any single aspect or any combination of aspects described below and/or in connection with one or more other processes described elsewhere herein.

In a first aspect, in process 400, transmitting the notification includes transmitting the notification prior to obtaining the data of interest from the host device.

In a second aspect, alone or in combination with the first aspect, in process 400, transmitting the notification includes transmitting an audible notification or a visual notification.

In a third aspect, alone or in combination with the first through second aspects, process 400 may include comparing obtained host device information, obtained based at least in part on the domain information, with stored host device information, stored in a central database, to determine whether the data of interest potentially includes harmful content.

In a fourth aspect, alone or in combination with the first through third aspects, process 400 may include comparing obtained host device information, obtained based at least in part on the domain information, with stored host device information to determine whether the data of interest potentially includes harmful content, wherein transmitting the notification includes transmitting the notification based at least in part on determining that the obtained host device information matches the stored host device information.

In a fifth aspect, alone or in combination with the first through fourth aspects, process 400 may include transmitting the domain information to a domain name services (DNS) server to obtain host device information, which includes a domain name or an internet protocol (IP) address associated with the host device.

In a sixth aspect, alone or in combination with the first through fifth aspects, process 400 may include transmitting obtained host device information, obtained based at least in part on the domain information, to the user device with the notification.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with providing a notification system in a VPN, according to various aspects of the present disclosure. In some aspects, the process 500 may be performed by a memory (e.g., memory 730) and/or a processor (e.g., processor 720, processing unit 110, etc.) associated with a VSP control infrastructure (e.g., VSP control infrastructure 104). As shown by reference numeral 510, process 500 may include configuring a VPN server to receive, from a user device, an indication that data of interest is to be requested, the indication including domain information associated with a host device capable of providing the data of interest. For instance, the VSP control infrastructure may utilize an associated memory and/or a processor to configure a VPN server to receive, from a user device, an indication that data of interest is to be requested, the indication including domain information associated with a host device capable of providing the data of interest, as discussed elsewhere herein.

As shown by reference numeral 520, process 500 may include configuring the VPN server to transmit, based at least in part on the domain information, a notification indicating to the user device that the data of interest to be received from the host device potentially includes harmful content. For instance, the VPN server may utilize the associated memory and/or processor to configure the VPN server to transmit, based at least in part on the domain information, a notification indicating to the user device that the data of interest to be received from the host device potentially includes harmful content, as discussed elsewhere herein.

Process 500 may include additional aspects, such as any single aspect or any combination of aspects described below and/or in connection with one or more other processes described elsewhere herein.

In a first aspect, in process 500, configuring the VPN server to transmit the notification includes configuring the VPN server to transmit the notification prior to obtaining the data of interest from the host device.

In a second aspect, alone or in combination with the first aspect, in process 500, configuring the VPN server to transmit the notification includes configuring the VPN server to transmit the notification includes transmitting an audible notification or a visual notification.

In a third aspect, alone or in combination with the first through second aspects, process 500 includes configuring the VPN server to compare obtained host device information, obtained based at least in part on the domain information, with stored host device information, stored in a central database, to determine whether the data of interest potentially includes harmful content.

In a fourth aspect, alone or in combination with the first through third aspects, process 500 includes configuring the VPN server to compare obtained host device information, obtained based at least in part on the domain information, with stored host device information to determine whether the data of interest potentially includes harmful content, wherein configuring the VPN server to transmit the notification includes configuring the VPN server to transmit the notification based at least in part on determining that the obtained host device information matches the stored host device information.

In a fifth aspect, alone or in combination with the first through fourth aspects, process 500 includes configuring the VPN server to transmit the domain information to a domain name services (DNS) server to obtain host device information, which includes a domain name or an internet protocol (IP) address associated with the host device.

In a sixth aspect, alone or in combination with the first through fifth aspects, process 500 includes configuring the VPN server to transmit obtained host device information, obtained based at least in part on the domain information, to the user device with the notification.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with providing a notification system in a VPN, according to various aspects of the present disclosure. In some aspects, the process 600 may be performed by a memory (e.g., memory 730) and/or a processor (e.g., processor 720, processing unit 110, etc.) associated with a VSP control infrastructure (e.g., VSP control infrastructure 104). As shown by reference numeral 610, process 600 may include maintaining, in a central database, stored host device information related to one or more host devices associated with providing harmful data, which potentially includes harmful content. For instance, the VSP control infrastructure may utilize an associated memory and/or a processor to maintain, in a central database, stored host device information related to one or more host devices associated with providing harmful data, which potentially includes harmful content, as discussed elsewhere herein.

As shown by reference numeral 620, process 600 may include configuring a VPN server to receive, from a domain name services (DNS) server, obtained host device information associated with a host device based at least in part on receiving an indication that data of interest is to be requested from the host device. For instance, the VPN server may utilize the associated memory and/or processor to configure the VPN server to receive, from a domain name services (DNS) server, obtained host device information associated with a host device based at least in part on receiving an indication that data of interest is to be requested from the host device, as discussed elsewhere herein.

As shown by reference numeral 630, process 600 may include configuring the VPN server to determine that the data of interest potentially includes harmful content based at least in part on determining that the obtained host device information matches the stored host device information. For instance, the VPN server may utilize the associated memory and/or processor to configure the VPN server to determine that the data of interest potentially includes harmful content based at least in part on determining that the obtained host device information matches the stored host device information, as discussed elsewhere herein As shown by reference numeral 640, process 600 may include configuring the VPN server to transmit, based at least in part on determining that the data of interest potentially includes harmful content, a notification indicating that the data of interest to be requested potentially includes harmful content. For instance, the VPN server may utilize the associated memory and/or processor to configure the VPN server to transmit, based at least in part on determining that the data of interest potentially includes harmful content, a notification indicating that the data of interest to be requested potentially includes harmful content, as discussed elsewhere herein Process 600 may include additional aspects, such as any single aspect or any combination of aspects described below and/or in connection with one or more other processes described elsewhere herein.

In a first aspect, process 600 may include configuring the VPN server to compare the obtained host device information with the stored host device information to determine whether the obtained host device information matches the stored host device information.

In a second aspect, alone or in combination with the first aspect, process 600 may include configuring the VPN server to receive the indication from a user device, the indication including domain information associated with the host device; and configuring the VPN server to transmit the domain information to the DNS server to receive the obtained host device information.

In a third aspect, alone or in combination with the first through second aspects, in process 600, maintaining the stored host device information includes updating the stored host device information.

In a fourth aspect, alone or in combination with the first through third aspects, in process 600, maintaining the stored host device information includes storing the stored host device information in a central database that is accessible by the VPN server.

In a fifth aspect, alone or in combination with the first through fourth aspects, in process 600, configuring the VPN server to transmit the notification includes configuring the VPN server to transmit the notification prior to obtaining the data of interest from the host device.

In a sixth aspect, alone or in combination with the first through fifth aspects, in process 600, configuring the VPN server to transmit the notification includes configuring the VPN server to transmit the notification includes transmitting an audible notification or a visual notification.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700, according to various aspects of the present disclosure. In some aspects, the example devices 700 may form part of or implement the systems, servers, environments, infrastructures, components, devices, or the like described elsewhere herein (e.g., VSP control infrastructure, VPN server, etc.) and may perform one or more processes described with respect to FIGS. 3-6. The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

FIG. 8 is an illustration of an example process 800 associated with providing a notification system in a VPN, according to various aspects of the present disclosure. In some aspects, the process 800 may be performed by a memory (e.g., memory 730) and/or a processor (e.g., processor 720, processing unit 110, etc.) associated with a VSP control infrastructure (e.g., VSP control infrastructure 104) and/or a VPN server (e.g., VPN server 120). As shown by reference numeral 810, process 800 may include transmitting, to a user device, a notification indicating that data of interest requested by the user device potentially includes harmful content, the data of interest to be obtained from a host device. For instance, the VSP control infrastructure and/or the VPN server 120 may utilize a communication interface (e.g., communication interface 770) along with an associated memory and/or a processor to transmit, to a user device, a notification indicating that data of interest requested by the user device potentially includes harmful content, the data of interest to be obtained from a host device, as discussed elsewhere herein.

As shown by reference numeral 820, process 800 may include receiving, from the user device, a response indicating that the data of interest is to be received by the user device. For instance, the VSP control infrastructure and/or the VPN server 120 may utilize the communication interface, associated memory, and/or processor to receive, from the user device, a response indicating that the data of interest is to be received by the user device, as discussed elsewhere herein.

As shown by reference numeral 830, process 800 may include receiving, based at least in part on the response, the data of interest from the host device. For instance, the VSP control infrastructure and/or the VPN server 120 may utilize the communication interface, associated memory, and/or processor to receive, based at least in part on the response, the data of interest from the host device, as discussed elsewhere herein As shown by reference numeral 840, process 800 may include transmitting the data of interest to the user device. For instance, the VSP control infrastructure and/or the VPN server 120 may utilize may utilize the communication interface, associated memory, and/or processor to transmit the data of interest to the user device, as discussed elsewhere herein.

Process 800 may include additional aspects, such as any single aspect or any combination of aspects described below and/or in connection with one or more other processes described elsewhere herein.

In a first aspect, process 800 may include receiving, from the user device, an indication that the data of interest is to be requested, the indication including domain information associated with the host device.

In a second aspect, alone or in combination with the first aspect, in process 800, transmitting the notification includes transmitting a domain name or an internet protocol (IP) address associated with the host device.

In a third aspect, alone or in combination with the first through second aspects, in process 800, transmitting the notification includes transmitting the notification prior to obtaining the data of interest from the host device.

In a fourth aspect, alone or in combination with the first through third aspects, process 800 may include receiving, from the user device, domain information associated with the host device; and transmitting the domain information to a domain name services (DNS) server to receive a domain name or an internet protocol (IP) address associated with the host device.

In a fifth aspect, alone or in combination with the first through fourth aspects, process 800 may include determining that the data of interest potentially includes the harmful content based at least in part on a result of comparing obtained host device information, obtained based at least in part on domain information received from the user device, and stored host device information that is stored in a central database.

In a sixth aspect, alone or in combination with the first through fifth aspects, in process 800, the harmful content includes malicious software or cookies or tracking information.

Although FIG. 8 shows example blocks of the process, in some aspects, the process may include additional blocks, fewer blocks, different blocks, or differently arranged blocks than those depicted in FIG. 8. Additionally, or alternatively, two or more of the blocks of the process may be performed in parallel.

As indicated above, FIG. 8 is provided as an example. Other examples may differ from what is described with regard to FIG. 8.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method for providing a notification system in a virtual private network (VPN), the method comprising:
   transmitting, by a VPN server to a user device prior to obtaining data of interest requested by the user device, a notification indicating that the data of interest potentially includes harmful content, the data of interest to be obtained from a host device;
   receiving, by the VPN server from the user device, a response indicating that the data of interest is to be received by the user device;
   receiving, by the VPN server based at least in part on the response, the data of interest from the host device;
   transmitting, by the VPN server, the data of interest to the user device; and
   enabling, by the VPN server based at least in part on receiving the response, an update to stored host device information stored in a central database, the update indicating a decrease in a likelihood that the host device includes harmful content in data provided by the host device.

2. The method of claim 1, further comprising:
   receiving, from the user device, a request for the data of interest, the request including domain information associated with the host device.

3. The method of claim 1, wherein transmitting the notification includes transmitting the notification to identify a domain name or an internet protocol (IP) address associated with the host device.

4. The method of claim 1, further comprising:
   receiving, from the user device, domain information associated with the host device; and
   transmitting the domain information to a domain name services (DNS) server to receive a domain name or an internet protocol (IP) address associated with the host device.

5. The method of claim 1, further comprising:
   determining that the data of interest potentially includes the harmful content based at least in part on a result of comparing obtained host device information, obtained based at least in part on domain information received from the user device, and the stored host device information that is stored in the central database.

6. The method of claim 1, wherein the harmful content includes malicious software or cookies or tracking information.

7. A device associated with a virtual private network (VPN) server, the device comprising:
   a memory; and
   a processor communicatively coupled to the memory, the memory and the processor being configured to:
      transmit, to a user device prior to obtaining data of interest requested by the user device, a notification indicating that the data of interest includes harmful content, the data of interest to be obtained from a host device;

receive, from the user device, a response indicating that the data of interest is to be received by the user device;

receive, based at least in part on the response, the data of interest from the host device;

transmit the data of interest to the user device; and enable, based at least in part on receiving the response, an update to stored host device information stored in a central database, the update indicating a decrease in a likelihood that the host device includes harmful content in data provided by the host device.

8. The device of claim 7, wherein the memory and the processor are configured to receive, from the user device, a request for the data of interest, the request including domain information associated with the host device.

9. The device of claim 7, wherein, to transmit the notification, the memory and the processor are configured to transmit the notification to identify a domain name or an internet protocol (IP) address associated with the host device.

10. The device of claim 7, wherein the memory and the processor are configured to:

receive, from the user device, domain information associated with the host device; and transmit the domain information to a domain name services (DNS) server to receive a domain name or an internet protocol (IP) address associated with the host device.

11. The device of claim 7, wherein the memory and the processor are configured to determine that the data of interest potentially includes the harmful content based at least in part on a result of comparing obtained host device information, obtained based at least in part on domain information received from the user device, and the stored host device information that is stored in the central database.

12. The device of claim 7, wherein the harmful content includes malicious software or cookies or tracking information.

13. A non-transitory computer-readable medium configured to store instructions, which when executed by a processor associated with a virtual private network (VPN) server, cause the processor to:

transmit, to a user device prior to obtaining data of interest requested by the user device, a notification indicating that the data of interest potentially includes harmful content, the data of interest to be obtained from a host device;

receive, from the user device, a response indicating that the data of interest is to be received by the user device;

receive, based at least in part on the response, the data of interest from the host device;

transmit the data of interest to the user device; and enable, based at least in part on receiving the response, an update to stored host device information stored in a central database, the update indicating a decrease in a likelihood that the host device includes harmful content in data provided by the host device.

14. The non-transitory computer-readable medium of claim 13, wherein the processor is configured to receive, from the user device, a request for the data of interest, the request including domain information associated with the host device.

15. The non-transitory computer-readable medium of claim 13, wherein the processor is configured to transmit the notification to identify a domain name or an internet protocol (IP) address associated with the host device.

16. The non-transitory computer-readable medium of claim 13, wherein the processor is configured to:

receive, from the user device, domain information associated with the host device; and transmit the domain information to a domain name services (DNS) server to receive a domain name or an internet protocol (IP) address associated with the host device.

17. The non-transitory computer-readable medium of claim 13, wherein the processor is configured to determine that the data of interest potentially includes the harmful content based at least in part on a result of comparing obtained host device information, obtained based at least in part on domain information received from the user device, and stored host device information that is stored in the central database.

* * * * *